United States Patent [19]

Reiff et al.

[11] 4,149,317
[45] Apr. 17, 1979

[54] MEASURING AND/OR TRACING DEVICE

[75] Inventors: Karl Reiff, Plochingen; Wolfgang Wagner, Warnau; Klaus Masur, Esslingen, all of Fed. Rep. of Germany

[73] Assignee: Fa. C. Stiefelmayer K.G., Esslingen, Fed. Rep. of Germany

[21] Appl. No.: 778,808

[22] Filed: Mar. 17, 1977

[30] Foreign Application Priority Data

Mar. 30, 1976 [DE] Fed. Rep. of Germany ....... 2613451

[51] Int. Cl.² .............................................. G01B 3/00
[52] U.S. Cl. .................................. 33/1 M; 33/169 R; 188/44
[58] Field of Search ............. 33/174 P, 174 L, 1 M, 33/139, 169 R; 188/67, 44, 166

[56] References Cited

U.S. PATENT DOCUMENTS

| 604,557 | 5/1898 | Baum | 188/44 X |
|---|---|---|---|
| 829,534 | 8/1906 | Ludlow | 188/44 |
| 2,717,663 | 9/1955 | Higgins | 188/67 X |
| 3,273,671 | 9/1966 | Vrana | 188/44 |
| 3,353,275 | 11/1967 | Porath | 33/174 P |
| 3,812,589 | 5/1974 | Schultheis | 33/139 |

FOREIGN PATENT DOCUMENTS 915226 1/1963 United Kingdom ............. 33/174 P

Primary Examiner—William D. Martin, Jr.
Attorney, Agent, or Firm—William Anthony Drucker

[57] ABSTRACT

A measuring and/or tracing device is of the kind having a vertical column, a transverse sliding unit secured to the column and movable in a vertical direction, a cross arm held by said unit and movable horizontally, a holder on the end of the said cross arm for a measuring and/or tracing tool, and a counterweight to balance the transverse sliding unit, said counterweight being disposed inside the column so that it can move freely and being attached to the transverse sliding unit by a cable passing over a guide roller at the upper end of the column. The improvement comprises a safety braking device attached to the transverse sliding unit and acting in conjunction with external surfaces of the column, to which braking device the cable is secured, and which in consequence of the cable tension exerted, is held in a disengaged position out of contact with the outer surfaces of the column, but which, when the cable tension falls, drops automatically into the braking position and engages with the outer surfaces of the column, thereby preventing movement.

10 Claims, 10 Drawing Figures

MEASURING AND/OR TRACING DEVICE

The invention concerns a measuring and/or tracing device with a vertical column to which is secured a transverse sliding unit which can be moved in a vertical direction and which holds a cross arm moving horizontally, on the end of which is a holder for the measuring and/or tracing tool, the transverse sliding unit being balanced by a counterweight which, preferably, is contained inside the column so that it can move freely and is attached to the transverse sliding unit by a cable passing over a guide roller at the upper end of the column. This measuring and/or tracing device is usually in the form of a three-dimensional apparatus which can be moved along one side of a horizontal levelling plate by means of a carriage bearing the vertical column.

The counterweight is usually made of lead and moves freely up and down inside the column corresponding to manually operated displacement of the transverse sliding unit and the cross arm. The weight of the counterweight corresponds approximately to that of the transverse sliding unit together with the cross arm and the tool holder which, depending on the size of the device, can easily be as much as 50 kg or even more. As a result of this balancing, the transverse sliding unit, with the cross arm, can be easily moved, thereby ensuring a high degree of operating convenience. In spite of the fact that the cable can be in the form of a wear-resistant and high-tensile wire rope, it is impossible entirely to exclude the risk of rupture of the wire or cable, due to wear which cannot be recognised in time. Should the cable break, there is a danger that the transverse sliding unit, together with the cross arm, will suddenly fall down along the vertical column. With the heavy transverse sliding unit and cross arm, and a high initial position on the column prior to a sudden cable failure, the result would be a high energy impact due to the large potential energy and the acceleration due to gravity. Such an impact can cause severe injury to operating staff who may happen to be underneath the cross arm, even with fatal results due to the blow. Apart therefrom, such an impact can lead to damage to, or even the complete destruction of the entire equipment and also of the plane surface of the levelling plate on to which the workpieces to be measured or traced are clamped and of any such clamped workpieces themselves. There can thus also be very considerable material damage.

OBJECT OF THE INVENTION

The object of the invention is to present a device of the category initially described which obviates this possibility and in which the risk is excluded of a sudden drop of the transverse sliding unit, with the cross arm, should the cable itself break or the counterweight or the transverse sliding unit be torn from the cable, thereby making a major contribution to the safety of operation where personal injury and material damage are concerned.

SUMMARY OF THE INVENTION

With a device of the type described above, as envisaged by the invention, this object is achieved by means of a safety braking device attached to the transverse sliding unit, acting in conjunction with the corresponding outside surfaces of the column, to which the cable is secured and which, in consequence of the cable tension exerted, is held in the disengaged position, out of contact with the outer surfaces of the column but, when the cable tension falls, especially in the event of cable failure, drops automatically into the braking position and engages with the outer surfaces of the column, thereby preventing movement. This safety braking device operates immediately the cable tension drops significantly or falls suddenly, that is to say, when the cable itself breaks or if the counterweight or the transverse sliding unit break away from the cable. In this event, the safety braking device drops automaticaly into its braking position and prevents the transverse sliding unit on the column from falling down of its own accord. This represents a major contribution to the safety of operation where personal injury and material damage are concerned. The operating and safety characteristics of the equipment are thus substantially enhanced without impairing that ease of operation inherent in the counterbalanced suspension of the transverse sliding unit and cross arm.

The cross-section of the vertical column is frequently rectangular in shape, having at least two outer faces opposite and approximately parallel to one another. In one advantageous version of a column formed in this way, provision is made for the safety braking device to have a pivoted frame mounted on the transverse sliding unit so that it can rotate around an axis running at some distance from the centre of the column, to one side of which the cable is attached at a distance from the pivoting axis, while to the other side, and also at a distance from the pivoting axis, at least one vertical brake adjusting spring, acting in the same direction as the force of the cable, is fitted, and for the pivoted frame, when rotating around the axis, into either the disengaged position or the braking position, to strike against braking elements fitted in the area of two opposite external surfaces of the column and located, in the disengaged position, largely out of contact with and at a distance from the corresponding outer surface and, in the braking position, in contact with the corresponding outer surface in such a way as to prevent movement. The pivoted frame acts as a tilting frame which, when the cable drops, automatically pivots around its eccentrically located axis, assisted by the brake adjusting spring which, in the form of a pre-stressed tension or compression spring, is then released and exerts force on the pivoted frame with a leverage dependent on the distance between the brake adjusting spring and the pivoting axis. The pivoted frame is thus subjected to a tilting torque which causes the pivoted frame to be rotated from a horizontal plane at right angles to the central longitudinal axis of the column into an oblique position which brings about gripping of the braking elements and the corresponding outer surfaces of the column, thereby clamping the transverse sliding unit to the column. This configuration is simple in design, cheap and reliable in operation. A further advantage is that, in the disengaged position, the braking elements are not in contact with the outer surfaces of the column, as a result of which, when the transverse sliding unit is moved vertically along the column, they do not come into frictional or sliding contact with the column. The ease of movement of the transverse sliding unit is thus fully preserved. There is no question of any additional wear on the outer faces of the column and/or on the faces of the braking elements.

A further advantageous version provides that the pivoted frame is in the form of a rectangular frame surrounding the column at a distance on all sides, extending at a distance above the transverse sliding unit, mounted on the transverse sliding unit by means of two opposite and approximately parallel side plates so that it can pivot around the horizontal axis and having at least one braking element on each of two cross bars approximately parallel to one another and connecting the side plates end to end, on the side facing the corresponding outer surface of the column. It can be an advantage if each cross bar has, along its length, two braking elements arranged at a distance from one another with, for each, a corresponding operating area on the outer surface of the column facing it. This ensures, in the braking position, a symmetrical and uniform action on the outer surfaces of the column. The braking elements on both cross bars can be arranged symmetrically to one another so that, in the braking position, the gripping forces are uniformly distributed. The cable can be secured to one of the cross bars, either at the centre of its length or at a distance therefrom, depending on the structure of the device and the track of the cable. The brake adjusting spring should then preferably be attached to the other cross bar on the opposite side, preferably at the centre of its length. It can also be an advantage if the brake adjusting spring is in the form of a compression spring, preferably a cylindrical coil spring, extending vertically and roughly parallel to the column between the transverse sliding unit and one of the cross bars and coming up against the underside of the latter, facing the transverse sliding unit.

In another advantageous version, the transverse sliding unit has, preferably on the same side as that on which the brake adjusting spring is fitted, a stop which extends in a direction vertical to the rectangular frame and is designed to act as a stop for restricting the angle through which the rectangular frame can pivot when the force of the cable is applied. In this case, the stop can be in the form of a section of tube mounted on the transverse sliding unit, the compression spring being contained and centred inside this tube. The stop thus serves a second purpose at no additional cost.

The layout can also be such that the stop is adjusted on the transverse sliding unit in such a way that, when the force of the cable is applied, the rectangular frame is aligned mainly within a horizontal plane and the braking elements, together with their end faces opposite and parallel to the corresponding operating area on the outer surface of the column, are at least at a short distance from the corresponding operating surface. The said distance of the end faces from the operating surfaces can be relatively small, e.g., only a few hundredths of a mm. When braking is required, the rectangular frame then tilts only slightly, e.g., by some 5°, from the horizontal position, corresponding to the disengaged position, to the braking position. The lever arm between the point of engagement of the cable with the rectangular frame and it pivoting axis can be very short, whereas it is, on the other hand, an advantage if the other lever arm between the pivoting axis and the point of engagement of the compression spring is as long as possible, so that, even if the compression spring exerts only very slight pressure, it generates a very large tilting torque for tilting the rectangular frame into the braking position.

In the case of a further advantageous version, the layout is such that the braking elements form in each case integral components of the cross bars and that each cross bar is mounted at both ends on the side plates so that it can pivot freely around a tilting axis running in its longitudinal direction. This ability to pivot freely and relatively between the side plates, on the one hand, and the two cross bars, with their integral braking elements, on the other hand, is of advantage because, as a result, when the rectangular frame tilts into its braking position, the cross bars can, relative to the side plates, automatically rotate around the tilting axis in such a way that the end faces of the braking elements which bring about braking and blocking of movement are aligned parallel to the corresponding operating area on the outer surface of the column. The gripping force between the rectangular frame, with the side plates and braking elements, on the one hand, and the column on the other hand, is generated by the fact that, when the rectangular frame rotates into the tilted position, there is a reduction in the distance between the end faces of two opposite braking elements as compared with the horizontal disengaged position. When the safety brake device comes into operation, neither it nor the outer surfaces of the column suffer any damage. The braking device is thus subject to little wear in the long term, and is ready to operate again at any time.

In another embodiment, the cross bars can be rigidly connected to the side plates so that they cannot rotate, e.g., integrally with them. The braking elements, or at least some of them, are in this case fitted inside the cross bars so that they can rotate around tilting axes running in the longitudinal direction of the cross bars. In a further embodiment, the braking elements are in the form of studs of partly cylindrical cross-section, the end face of which is, on one side, a plane surface, and which are fitted in partly cylindrical grooves in the cross bars so that they can rotate around their central longitudinal axis and are self-adjusting. This version makes possible the relative adjustment between the braking elements, on the one hand, and the frame as a whole on the other hand. The partly cylindrical studs can, of their own accord, rotate within the correspondingly shaped grooves in the cross bars in such a way that, in the braking position, they run with their end faces parallel to the corresponding operating area on the outer surface of the column.

In accordance with a further advantageous embodiment, at least one stud on a cross bar, and preferably the studs situated opposite one another and transversely staggered in relation to one another, have a plane surface which, in terms of its central longitudinal axis, is oblique and wedge-shaped, and are fitted, so that they can be moved longitudinally and be adjusted by means of adjusting screws, in grooves in the cross bar running obliquely to the longitudinal direction of the cross bars, while the remaining studs have plane surfaces approximately parallel to their central longitudinal axis and are fitted in grooves extending parallel to the longitudinal direction of the cross bars. This makes it possible to adjust the distance between two opposite studs forming braking elements by moving, in the case of each cross bar, the stud with the oblique plane surface by adjusting the adjusting screws along the obliquely running groove. This oblique movement gives rise to one component in a direction parallel to the side plates of the rectangular frame. It is thus possible, by simple means, to achieve fine adjustment of the distance between opposite end faces of the braking elements and thereby to obtain sensitive adaptation to the dimensions of individual vertical columns which, in regard to the manufacture of individual apparati, are not restricted to rigid pre-conditions where their cross-sectional dimensions are concerned and can in consequence vary. It follows that the braking device can easily and simply be adapted to these variations in the cross-sectional dimensions of the columns.

In another version, the braking elements are in the form of cylindrical gripping rollers or gripping balls fitted in the region of both mutually opposite outer surfaces of the column. In this case, the safety braking device is based on the general principle of gripping rollers.

In a further advantageous embodiment, the layout is such that, on each side of the transverse sliding unit facing an outer surface of the column, a longitudinal strip is fitted at a distance from the outer surface, of which the inner surface facing the outer surface is in the form of a flat oblique surface inclined towards the central longitudinal axis of the column in such a way that, together with the corresponding outer surface of the column, it forms a gripping slot tapering like a wedge towards the upper end of the column, and that, in each gripping slot, there is a cylindrical gripping roller which is acted upon and flexibly forced into the gripping slot by at least one compression spring fitted in the transverse sliding unit and preferably by two compression springs located at a distance from one another along the cylindrical gripping roller. The arrangement can also be such that the pivoted frame is in the form of a U-shaped bracket, the pivoting axis of which runs at approximately right angles to the central longitudinal axis of the cylindrical gripping rollers and to the two flanks of the bracket, and that each bracket flank bears a tongue extending above the corresponding cylindrical gripping roller and approximately parallel to it and to the corresponding outer surface of the column, this tongue running at a short distance from the outer surface of the column and between it and the central longitudinal axis of the cylindrical gripping roller and, when the force of the cable is exerted on the pivoted frame, engages in the gripping slot from above and from the side opposite the compression spring, presses eccentrically with its lower edge against the cylindrical gripping roller and forces the latter vertically downwards out of the gripping slot and, at same time, obliquely thereto away from the outer surface of the column and against the oblique surface.

In the case of this embodiment, too, there is, in the disengaged position of the safety braking device, no contact between the cylindrical gripping rollers and the outer surfaces of the column, because, in this position, the U-shaped bracket is held, against the force exerted by the cable, in a position in which it lies in, for example, a horizontal plane. At the same time, the tongues of each U-shaped flank press in a vertical direction, and opposite to the direction of taper of the gripping slot, against the corresponding cylindrical gripping rollers, in the region of a cylinder generatrix running with parallel displacement towards the vertical diametral plane of the cylindrical gripping rollers. As a result, the cylindrical gripping rollers are forced out of the gripping slot and also, within the horizontal plane, away from the outer surface of the column and against the oblique face of the gripping slot. In the process, the compression springs on the cylindrical gripping rollers resisting this movement are compressed. If the force of the cable is reduced, then the compression springs force the cylindrical gripping rollers into the gripping slot. In addition, the transverse sliding unit can move slightly along the column, in consequence of which the cylindrical gripping rollers which, when the safety braking device operates, come into contact with the outer surface of the column, are additionally moved by rolling into the gripping slot, in the event of the compression springs being unable, of themselves, to bring this about or, contrary to expectations, be ineffective as a result of breakdown or damage. Due to the movement of the cylindrical gripping rollers into the gripping slot, the tongues are raised vertically, causing the U-shaped bracket to be rotated around its pivoting axis from its normal position into, for example, an inclined position. The safety braking device in this form is of simple design and exceptionally reliable. A brake adjusting spring in the form of a cylindrical compression spring can be fitted between each flank of the bracket and the transverse sliding unit. This provides additional safety, as it means that a second spring-loaded restoring force acts on the U-shaped bracket in the event of cable failure. At least one of the longitudinal strips can have, as a thrust block for the pivoted frame when the cable force is exerted, a stop which should preferably be adjustable and which projects vertically and faces the corresponding bracket flank. This stop limits the depth to which the tongues can pass into the gripping slot and thus also the movement of the cylindrical gripping rollers out of and across the gripping slot.

BRIEF DESCRIPTION OF THE DRAWINGS

The invention is described in greater detail below with the aid of the embodiments shown in the drawings, which depict.

DESCRIPTION OF THE PREFERRED EMBODIMENTS

Figure 1:
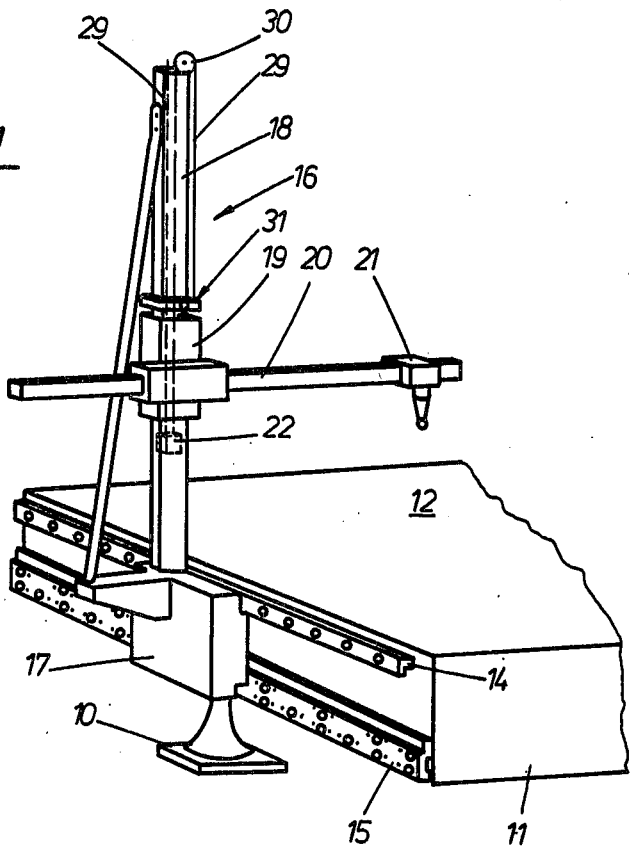
FIG. 1 a perspective, diagrammatic view of a three-dimensional measuring and/or tracing device, with levelling plate, FIG. 2 an enlarged side view of the upper part of the transverse sliding unit on the column with a safety braking device in accordance with a first example of an embodiment, shown as a solid line in the disengaged position and as a broken line in the braking position, FIG. 3 a diagrammatic side view, on a reduced scale as compared with FIG. 2, of the safety braking device shown in FIG. 2, in the braking position, FIG. 4 a view from above, partly in horizontal section, of the transverse sliding unit with safety braking device as in FIG. 2, FIG. 5 a view from above, partly in horizontal section, corresponding approximately to that in FIG. 4, of a transverse sliding unit with braking device in accordance with a second example of an embodiment, FIG. 6 a section along the line VI — VI in FIG. 5, FIG. 7 a vertical longitudinal section through a part of the transverse sliding unit with a safety braking device in accordance with a third example of an embodiment, FIG. 8 a partly sectional side view of the transverse sliding unit with safety braking device in accordance and with FIG. 7, FIG. 9 a view from above of the transverse sliding unit with safety braking device, as in FIG. 7, FIG. 10 an enlarged vertical longitudinal section through a part of the safety braking device in accordance with FIG. 7, the braking elements of which are shown as solid lines in the disengaged position and as broken lines in the braking position.

FIG. 1 shows a stationary levelling plate 11, supported on a foot 10, with an upper plane surface 12 on to which the workpieces to be measured and/or traced can be clamped. On its visible longitudinal side, the levelling plate 11 has an upper angles rail 14 and, below the latter, a guide rail 15 on and along which a three-dimensional measuring and/or tracing device 16 can move along the longitudinal side of the levelling plate 11 by means of a carriage 17 with a vertical column 18 mounted thereon perpendicular to the plane surface 12, on which a transverse sliding unit 19 can move, on which a cross arm 20 is adjustably mounted to move in a horizontal direction and parallel to the plane surface 12. Near the end of the cross arm 20 is a holder 21 for a measuring or tracing tool which is not illustrated.

The transverse sliding unit 19 thus carries the cross arm 20 with the holder 21 and can, in the case of large devices, be of considerable weight, which can easily be as much as 50 kg or even more. For the purpose of ease of movement of the transverse sliding unit 19 along the column 18, the transverse sliding unit is balanced by a counterweight 22 shown by broken lines in FIG. 1. The column 18 is of rectangular cross-section (cf. FIG. 4) and is hollow inside. It has two outer surfaces 23 and 26, opposite and parallel to one another, which are of interest in the following description and each of which is divided into two parallel operating surfaces 24, 25 and 27, 28 respectively (cf. FIG. 4). The counterweight 22 is usually made of lead and is contained inside the column 18 where it can move freely. Attached to counterweight 22 is a cable 29 which runs inside the column 18, passes over a guide roller 30 at the upper end of the column and continues with its clearly visible section outside the column 18 as far as the transverse sliding unit 19, to which it is attached.

In the event of breakage of the cable 29 or detachment of the counterweight 22 or the transverse sliding unit 19, there is a danger that the transverse sliding unit 19, together with the cross arm 20, the holder 21 and any tool attached thereto will suddenly fall vertically down along the column 18, causing injury to persons and/or material damage. This is prevented by a safety braking device 31 mounted on the transverse sliding unit 19 and operating in conjunction with the corresponding outer surfaces 23 and 26 (FIG. 2) of the column 18. The visible end of the cable 29 is attached to the safety braking device 31. As a result of the force exerted by the cable (FIG. 2), the device 31 is held in the disengaged position indicated by solid lines and out of contact with the outer surfaces 23, 26 of the column 18. The device 31 is also shown in this disengaged position in FIG. 4. If, however, the tension of the cable should drop, such as in the event of breakage of the cable, then the device 31 falls automatically into its braking position and engages, in such a manner as to block any movement, with the outer surfaces 23 and 26 of the column 18. This braking position, blocking any movement, is shown as broken lines in FIG. 3 and also in FIG. 2.

Figure 3:
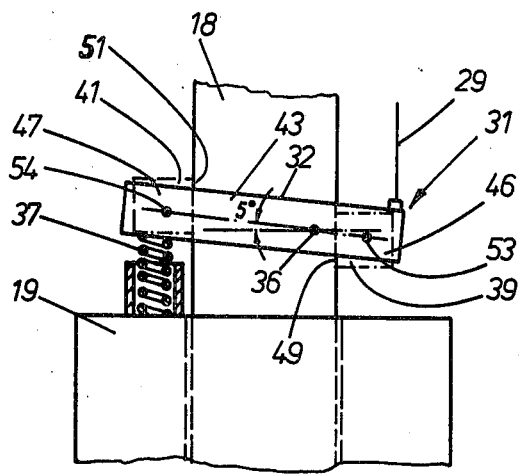
Figure 2:
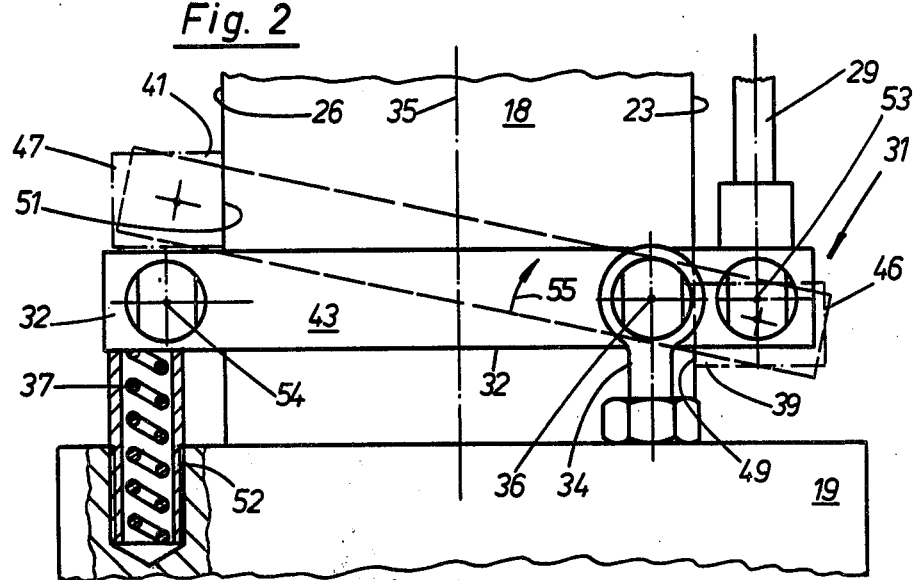
Figure 4:
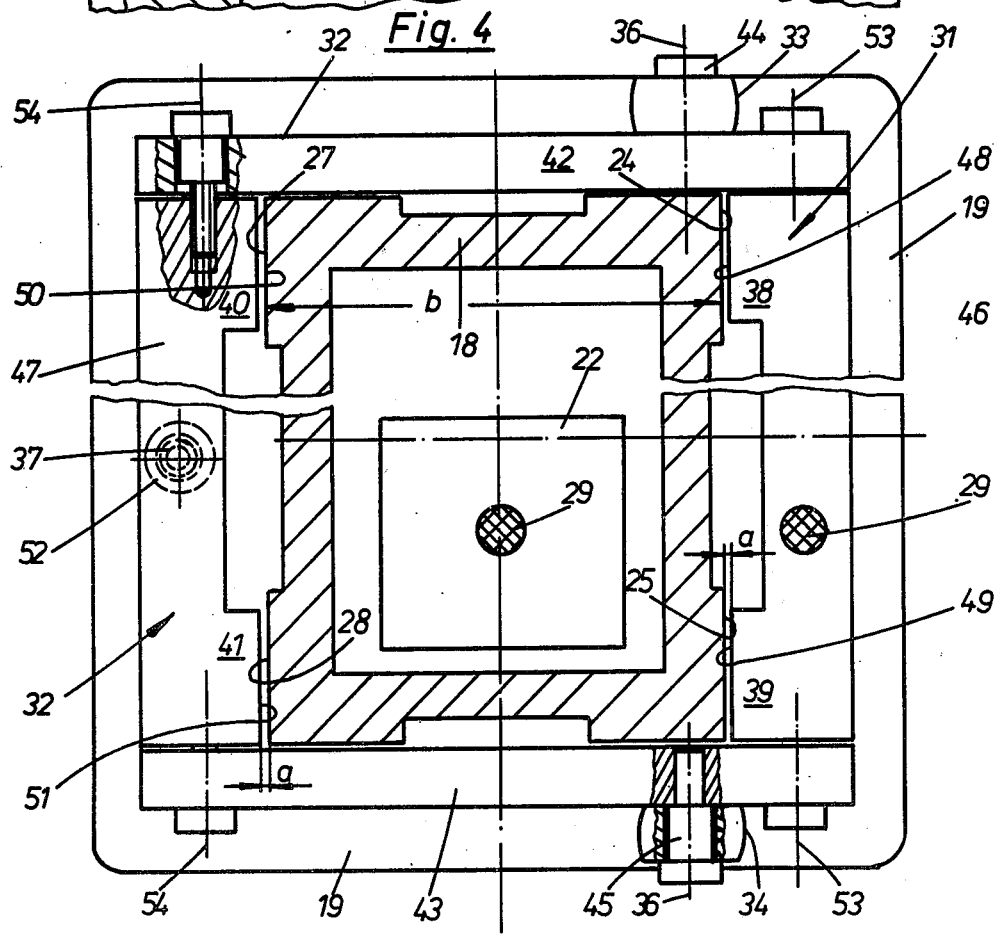

In the case of the first example in accordance with FIGS. 2-4, the safety braking device 31 has a pivoted frame 32 in the form of a rectangular frame surrounding the rectangular column 18 at a distance on all sides. The pivoted frame 32 is fitted above the transverse sliding unit 19 and secured to it, by means of two eyebolts 33, 34 standing proud in a vertical direction upwards from the transverse sliding unit 19, so that it can pivot around a horizontal pivoting axis 36 at a distance from the centre of the column (central longitudinal axis 35). The cable 29 is secured to the pivoted frame 32 at one side of the pivoting axis 36, at a relatively short distance therefrom. On the other, transversely opposite side, and at a considerably greater distance from the pivoting axis 36, at least one vertical brake adjusting spring 37, in the form of a cylindrical compression spring, is attached, acting in the same direction as the force of the cable. When the pivoted frame 32 rotates around the pivoting axis 36 into the braking position (FIG. 3), it strikes against braking elements 38, 39 and 40, 41 fitted in the area of two opposite external surfaces 23 and 26 of the column 18 which, in the disengaged position shown as solid lines in FIG. 4 or also in FIG. 2, are largely out of contact with and at a distance a from the corresponding outer surface 23 or 26 and in the braking position as shown in FIG. 3, or as broken lines in FIG. 2, are in contact with the corresponding outer surface 23 or 26 in such a way as to prevent movement. In the disengaged position, the distance a can be very small, amounting to only a few hundredths of a mm.

The pivoted frame 32 has two opposite and approximately parallel side plates 42, 43 (FIG. 4) which, in terms of the transverse sliding unit 19, can pivot freely around the pivoting axis 36 on pivot pins 44 and 45 fitted in the eyebolts 33 and 34. Strip-shaped cross bars 46 and 47, approximately parallel to one another, are mounted on both ends of the side plates 42, 43 and between them. The cable 29 is secured to the cross bar 46, eccentrically in terms of the path of the cable. The brake adjusting spring 37 is attached from below at the centre of its length to the other cross bar 47. The cross bar 46 carries the two braking elements 38 and 39, and the cross bar the two opposite braking elements 40 and 41. The braking elements 38 to 41 correspond in each case to an operating area 24' and 27, 28 on the column 18, to which, in the disengaged position shown in FIGS. 2 and 4, they run, with their appropriate end faces 48 to 51, approximately parallel and at a distance a. The distance between the end faces of two transversely opposite braking elements 38, 40 or 39, 41 is constant and is indicated in FIG. 4 by b. The braking elements 38 to 41 are thus arranged symmetrically to one another.

The brake adjusting spring 37 extends in a vertical direction between the transverse sliding unit and the pivoted frame 32 and approximately parallel to the column 18. It presses from below against the lower surface, facing the transverse sliding unit 19, of the left-hand cross bar 47, as seen in FIGS. 2 and 4. On the same side as the brake adjusting spring 37, the transverse sliding unit 19 has a stop 52 in the form of a section of tube which extends in a vertical direction to the rectangular frame 32 and is designed as a lower thrust stop for restricting the angle through which the frame 32 can pivot when the force of the cable (FIG. 2) is exerted. The brake adjusting spring 37 is contained and centred inside the tubular stop 52. The stop 52, with an external thread, can be adjustably screwed into a threaded hole drilled in the transverse sliding unit 19.

In the first example shown in FIGS. 2 and 4, the braking elements 38, 39 and 40, 41 are, as may be seen in particular from FIG. 4, in each case an integral component of the corresponding cross bars 46 and 47. Each cross bar 46 and 47 is mounted at both ends on the ends of the side plates 42 and 43 so that it can pivot freely around a tilting axis 53 or 54 running in its longitudinal direction. This permits free relative pivoting between the side plates 42, 43 on the one hand and the cross bars 46, 47, with the braking elements 38 to 41, on the other hand.

As may be seen in particular from FIG. 2, the stop 52 is adjusted on the transverse sliding unit 19 in a vertical direction in such a way that, when the force of the cable is applied, the pivoted frame 32 is aligned mainly within a horizontal plane, as is shown by solid lines, and the braking elements 38 to 41 run with their end faces 48 to 51 parallel to and at a short distance a from the corresponding operating areas 24, 25 and 27, 28, that is to say, they are not in contact with the column. There is in consequence no additional friction effect in or stiffness of movement of the transverse sliding unit 19 or any possibility of wear.

The disengaged position of the pivoted frame 32 shown in FIG. 2 represents normal operation, with the force of the cable being exerted. A moment, determined by the cable force exerted at a distance from the pivoting axis, acts around the pivoting axis 36 on the frame 32. In the process, the left-hand cross bar 47 compresses the brake adjusting spring 37 in the tubular stop 52 until its lower surface comes up against the upper end face of the stop 52. The force exerted via the cable 29 on the frame 32 is thus cushioned by the transverse sliding unit 19 and the stop 52.

If the tension of the cable drops, e.g., in the event of failure of the cable, then the frame 32 can pivot around the axis 36 in the direction of the arrow 55 (clockwise direction). The pivoting movement is reinforced by the pressure the exerted on the left-hand cross bar 47 by the brake adjusting spring 37 which, together with the lever arm, and depending on the distance between the spring 37 and the pivoting axis 36, results in a pivoting moment in the direction of the arrow 55. The pivoted frame 32 then rotates into the position shown by broken lines in FIG. 2. This leads to rotation of the cross bars 46, 47 relative to the side plates 42, 43 in such a way that, as before, the end faces 48 to 51 of the braking elements 38 to 41 are aligned parallel to the corresponding operating areas 24, 25 and 27, 28, so that no tilting occurs, with possible damage to the operating areas. As a result of the tilted position of the pivoted frame 32 (broken lines in FIG. 2), the distance between the tilting axes 43, 44 — regarded within a horizontal plane — is reduced, so that the braking elements 38 to 41, with their end faces 48 to 51, now come up against the corresponding operating areas 24, 25 and 27, 28 on the column, with a braking and gripping effect. The transverse sliding unit 19 is prevented from falling downwards in a vertical direction of its own accord.

Figure 5:
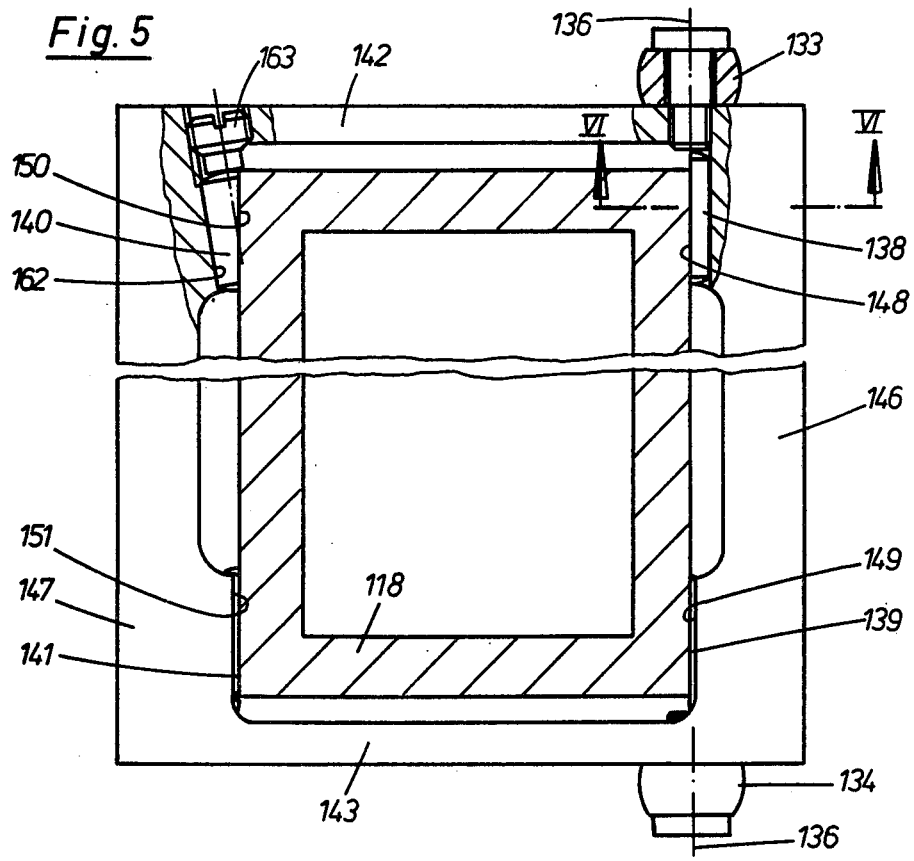
Figure 6:
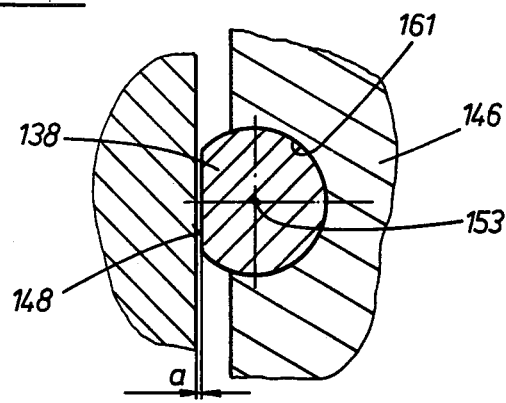

In the case of the second embodiment illustrated in FIGS. 5 and 6, those parts which correspond to the first embodiment are allotted reference numbers increased by 100, to enable reference to be made to the description of the first embodiment.

In the second embodiment, the cross bars 146, 147 are rigidly connected, so that they cannot rotate, to the side plates 142, 143, i.e., they are integral with them. The braking elements, on the other hand, or at least some of them, are fitted inside the cross bars 146, 147 so that they can rotate around tilting axes, of which the tilting axis 153 is shown in FIG. 6, running in the longitudinal direction of the cross bars 146, 147. The braking elements are in the form of studs 138 to 141 to partly cylindrical cross-section having, on one side, a plane surface forming the end face 148 to 151, which are fitted in grooves of partly cylindrical cross-section, of which only the groove 161 of the stud 138 and 162 of the stud 140 are visible in FIGS. 5 and 6, in the cross bars 146, 147 so that they can rotate and are self-adjusting.

Each transverse stud of a cross bar 146, 147, or both transverse studs of a cross bar have, as is shown in FIG. 5 for the transverse stud 140, a plane end face 150 which, in terms of its central longitudinal axis, is oblique and wedge-shaped, due to the fact that, starting with a cylindrical stud, it is machined at an angle to its central longitudinal axis. Whilst the cross-section of the groove 162 corresponding to this stud 140 is partly cylindrical, the stud is aligned obliquely to the longitudinal direction of the cross bar 147 in such a way that it slopes towards the outer surface of the column 118. The stud 140 is held inside this oblique groove 162 so that it can move longitudinally and be adjusted by means of an adjusting screw 163. It will be realised that one such obliquely machined and longitudinally moveable stud is sufficient for each of the cross bars 146, 147. In this case, it can be of advantage if these studs are arranged so that they are diagonally staggered relative to one another. In another embodiment, one cross bar, e.g., the cross bar 147, can have, near each end, a stud with an obliquely machined plane surface located in a corresponding oblique groove. This configuration of the studs makes it possible to increase or decrease the distance b between two opposite end faces of the braking elements, depending on the size, as measured in this direction, of the cross-section of the column 118. This adjustability is an advantage, because the size, measured in this direction, of the cross-section of the columns 118 can vary, seeing that it is not important to the dimensions and operation of the equipment. In consequence, one and the same pivoted frame can be used for columns 118 of varying dimensions and can, by operating the adjusting screws 163, be adapted to the distance b in question.

Figure 7:
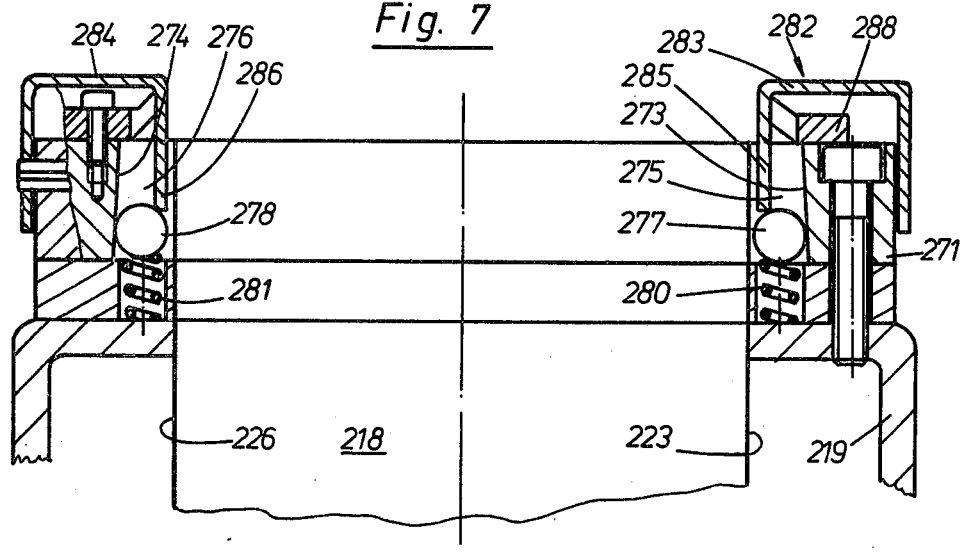
Figure 8:
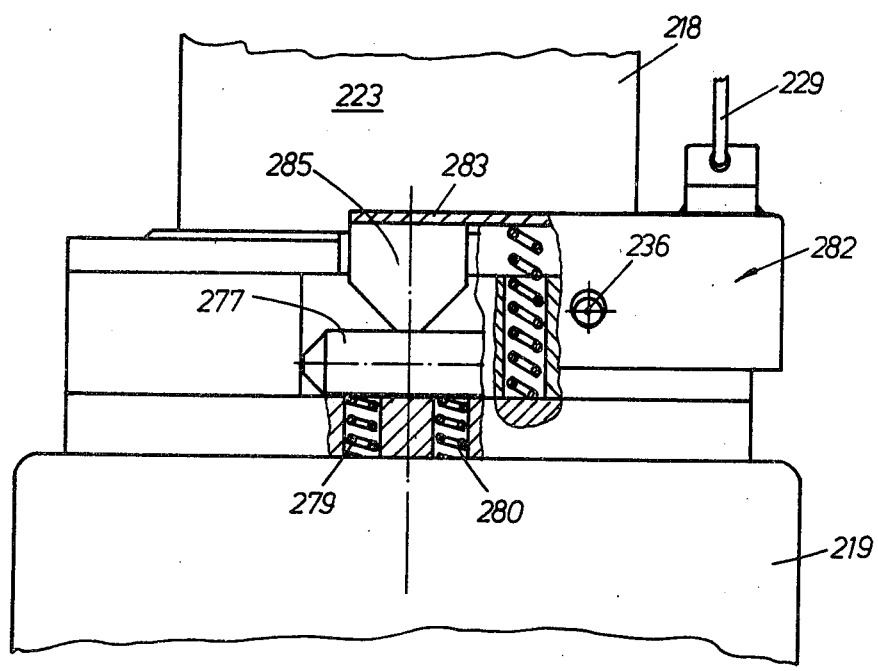
Figure 9:
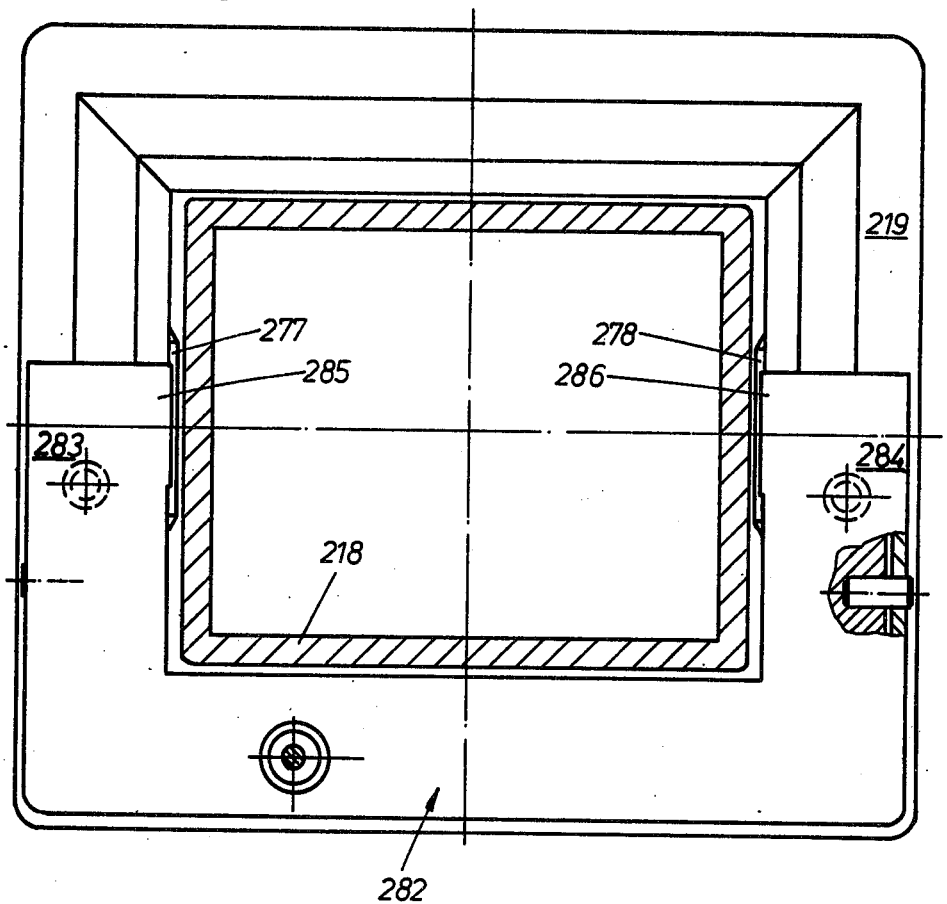
Figure 10:
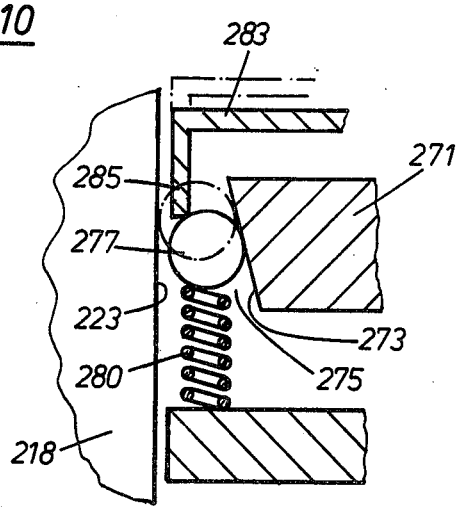

In the case of the third embodiment illustrated in FIGS. 8–10, those parts which correspond to the first and/or second embodiment are allotted reference numbers increased by 200, to enable reference to be made to the description of the previous embodiments. In the case of the third embodiment, a longitudinal strip 271, 272 is fitted, at a distance from the outer surface 223 and 226, to each side of the transverse sliding unit 219 corresponding to an outer surface 223 and 226 of the column 218. The inner surface of each longitudinal strip 271, 272 facing the outer surface 223 and 226 is in the form of a flat oblique surface which is inclined towards the central longitudinal axis of the column 235 in such a way that, together with the corresponding outer surface 223 and 226, it forms a gripping slot 275 or 276 tapering, in the form of a slight wedge, towards the upper end of the column, in each case at an inclination of, for example, 3°. In each gripping slot 275 and 276, there is a cylindrical gripping roller 277 or 278 which is acted upon and flexibly forced into the gripping slot 275 or 276 by two compression springs fitted vertically in the transverse sliding unit 219 at a distance from one another and along its central longitudinal axis. Of these compression springs, the springs 279, 280 of the cylindrical gripping roller 277 seen on the right in FIG. 7, and only one spring 281 of the left-hand cylindrical gripping roller 278 are visible.

In this case, the pivoted frame is designed in the form of a U-shaped bracket 282, the pivoting axis 236 of which runs at approximately right angles to the central longitudinal axis of the cylindrical rollers 277, 278 and to its two bracket flanks 283, 284.

As is shown especially in FIGS. 7 and 10, each bracket flank 283, 284 bears a tongue 285, 286 extending above the corresponding cylindrical gripping roller 277 or 278 and approximately parallel to it and to the corresponding outer surface 233 or 226 of the column 218. Each tongue 285, 286 runs at a short distance from the outer surface 223 or 226 of the column 218 and between it and the central longitudinal axis of the corresponding cylindrical gripping roller 277 or 278 (cf, especially FIG. 7, FIG. 10). When the force of the cable is exerted on the U-shaped bracket 282, the tongue 285, 286 engages in the corresponding gripping slot 275 or 276 in a vertical direction from above and from the side opposite to the compression spring 279, 280 or 281. Each tongue 285, 286 presses eccentrically against the corresponding cylindrical gripping roller 277 or 278 and, in the illustration according to FIG. 7, forces it downwards out of the corresponding gripping slot 277, 276 and, at the same time — as seen within an approximately horizontal plane —, obliquely thereto away from the corresponding outer surface 223 or 226 of the column 218 and against the corresponding oblique surface 273 or 274. In the process, the corresponding compression springs 279, 280 or 281 are compressed and pre-stressed.

As shown in FIG. 8 in the case of the bracket flank 283, a brake adjusting spring 287 in the form of a cylindrical compression spring is fitted between each flank of the bracket and the transverse sliding unit 219. This spring is secured and compressed endwise between the transverse sliding unit 219 and the bracket flank 283 as long as the U-bracket 282 is in the disengaged position shown in FIG. 8. This is shown, excessively englarged, in FIG. 10. It will be seen that, in this disengaged position, the cylindrical gripping rollers 277, 278 are in each case at a distance from the corresponding outer surfaces 223 and 226. At least one of the longitudinal strips 271, 272 has, as a thrust block for the U-bracket 282 when the cable force is exerted, a stop 288 which is, for example, adjustable for height and which projects vertically and faces the corresponding bracket flank 283 or 284. In a further embodiment, which is not illustrated, this stop can be located elsewhere and be of a different configuration.

In the case of this third embodiment, also, there is, in the disengaged position, e.g., as in FIG. 10, no contact between the cylindrical gripping rollers 277, 278 and the corresponding outer surfaces 223 and 226 because, in this position, the U-bracket 282 is held, against the force exerted by the cable, in the position shown in FIG. 8, in which it lies in, for example, a horizontal plane. At the same time, the tongues 285, 286 of each bracket flank 283 or 284 press in a vertical direction, and opposite to the direction of taper of the gripping slot 275 or 276, against the corresponding cylindrical gripping rollers 277, 278 in the region of a cylinder generatrix running with parallel displacement towards the vertical diametral plane of the cylindrical gripping roller. As a result, the cylindrical gripping rollers 277, 278 are forced out of the gripping slot 275 or 276 and also — as seen within a horizontal plane — away from the outer surface 223 or 226 and against the corresponding oblique face 273 or 274. In the process, the compression springs 279, 280 or 281 are compressed. The limiting stop can also be fitted underneath the cylindrical gripping rollers 277, 278, for example, it can be the part in which the compression springs 279, 280 or 281 are held. If the cylindrical gripping roller is fully pressed in a vertical direction on to this strip-shaped part, then this determines the end position corresponding to the disengaged position.

If the force of the cable now drops, then the compression springs 279, 280 and 281 force the corresponding cylindrical gripping roller 277 or 278 into the gripping slot 275 or 276. The U-bracket 282 and, with it, the transverse sliding unit 219 are braced transversely to and with the column 218 in accordance with the gripping roller principle, and prevented from sliding vertically downwards. The cylindrical gripping rollers 277, 278, which are forced via the compression springs into the corresponding gripping slot 275 or 276, act in a vertical direction on the corresponding tongues 285 or 286, whereby the U-bracket 282 is rotated around its pivoting axis 236 into the braking position. This is reinforced by the additional brake adjusting spring 287, which acts directly on the bracket flank 283. In addition, when the force of the cable drops, the transverse sliding unit 219 moves very slightly on the column 218, in consequence of which the cylindrical gripping rollers 277, 278, which then come into contact with the corresponding outer surfaces 223 or 226 of the column 218, are additionally moved by rolling into the corresponding gripping slot 275 or 276, in the event of the compression springs 279, 280 and 281 being unable, of themselves, to bring this about or being ineffective as a result of breakdown or damage.

We claim:

1. In a measuring and tracing device, of the kind having:
   (i) a hollow vertical column
   (ii) a transverse sliding unit movable along said column
   (iii) a cross arm supported by said sliding unit and horizontally slidable therein
   (iv) a holder on said cross arm to hold a tool
   (v) a guide roller journalled at the upper end of the vertical column
   (vi) a cable passed over said roller and having one end portion external of the column and secured to the sliding unit, and the other end portion inside the vertical column, and
   (vii) a counterweight disposed in the vertical column and secured to said other end portion of the cable for counterbalancing the sliding unit, the improvement which comprises:
   (a) two outwardly facing parallel outer braking surfaces on the vertical column
   (b) journal means mounted on the sliding unit, the axis of rotation of which journal means is horizontal and spaced laterally from the median vertical axis of the column, and is parallel to the outer braking surfaces of the vertical column
   (c) a pivoted frame surrounding and spaced from the vertical column, said frame being carried by the journal means
   (d) braking elements carried by the pivoted frame and positioned each opposite to an outer braking surface of the vertical column
   (e) a brake adjusting spring abutting the sliding unit and the pivoted frame to urge the pivoted frame to rotate about the axis of the journal means in the direction to bring the braking elements into contact with the outer braking surfaces of the vertical column (f) the said one end portion of the cable, external of the vertical column, being secured to said pivoted frame such that the tension in the cable exerted by the counterweight urges the pivoted frame in the opposite direction to move the braking elements away from the outer braking surfaces of the vertical column the cable tension being greater than the force of the brake adjusting spring such that the braking elements are normally held away from the outer braking surfaces but in the event of removal of the cable tension the brake adjusting spring moves the pivoted frame to cause the braking elements to grip the outer braking surfaces.

2. A device, in accordance with claim 1, wherein the pivoted frame is in the form of a rectangular frame surrounding the column on all sides, extending at a distance above the transverse sliding unit, and is mounted on the transverse sliding unit by means of two opposite and approximately parallel side plates so that it can pivot around the horizontal axis, and has at least one braking element on each of two cross bars disposed approximately parallel to one another and connecting the side plates end to end, on the side facing the corresponding outer surface of the column.

3. A device, in accordance with claim 2, wherein each cross bar has, along its length, two braking elements arranged at a spacing from one another with, for each, a corresponding operating area on the outer surface of the column facing it.

4. A device, in accordance with claim 3, wherein the braking elements on both cross bars are arranged symmetrically to one another.

5. A device, in accordance with claim 1, wherein the cable is secured to one cross bar and that the brake adjusting spring is attached to the other cross bar, approximately at the centre of its length.

6. A device, in accordance with claim 5, wherein the brake adjusting spring is in the form of a compression spring, extending vertically and approximately parallel to the column between the transverse sliding unit and one of the cross bars and abutting against the underside of the cross bar, facing the transverse sliding unit.

7. A device, in accordance with claim 2, wherein the transverse sliding unit has a stop which extends in a direction vertical to the rectangular frame and is adapted to act as a stop for restricting the angle through which the rectangular frame can pivot when the force of the cable is applied.

8. A device, in accordance with claim 6, wherein the stop is a section of tube mounted in the transverse sliding unit, the compression spring being contained and centred inside said tube.

9. A device, in accordance with claim 7, wherein the stop is adjusted on the transverse sliding unit in such a way that, when the force of the cable is applied, the rectangular frame is aligned substantially within a horizontal plane and the braking elements, together with their end faces opposite and parallel to the corresponding operating area on the outer surface of the column, are at least at a short distance (a) from the corresponding operating area.

10. A device, in accordance with claim 2, wherein the braking elements form in each case integral components of the cross bars, and each cross bar is mounted at both ends on the side plates so that it can pivot freely around a tilting axis running in its longitudinal direction.

* * * * *